(12) United States Patent
Hobbs et al.

(10) Patent No.: US 8,529,645 B2
(45) Date of Patent: Sep. 10, 2013

(54) HYDROGASIFICATION REACTOR AND METHOD OF OPERATING SAME

(75) Inventors: Raymond Hobbs, Avondale, AZ (US); Donald Karner, Phoenix, AZ (US); Xiaolei Sun, Chandler, AZ (US); John Boyle, Emmaus, PA (US); Fuyuki Noguchi, Hyogo (JP)

(73) Assignee: Arizona Public Service Company, Phoenix, AZ (US)

( * ) Notice: Subject to any disclaimer, the term of this patent is extended or adjusted under 35 U.S.C. 154(b) by 891 days.

(21) Appl. No.: 11/866,871

(22) Filed: Oct. 3, 2007

(65) Prior Publication Data
US 2009/0090054 A1  Apr. 9, 2009

(51) Int. Cl.
*C10J 3/08* (2006.01)

(52) U.S. Cl.
USPC .......................................... 48/62 R (58) Field of Classification Search
USPC .................................. 48/62 R–62 A
See application file for complete search history.

(56) References Cited

U.S. PATENT DOCUMENTS

| | | | | |
|---|---|---|---|---|
| 2,985,324 A * | 5/1961 | Balentine | ...................... | 414/217 |
| 4,153,426 A * | 5/1979 | Wintrell | .............................. | 48/73 |
| 4,610,697 A * | 9/1986 | Darling et al. | .................... | 48/77 |
| 2003/0174756 A1* | 9/2003 | Groen | ........................... | 374/141 |
| 2006/0265953 A1* | 11/2006 | Hobbs | ......................... | 48/127.3 |
| 2007/0079554 A1* | 4/2007 | Schingnitz et al. | ............. | 48/210 |

* cited by examiner

*Primary Examiner* — Imran Akram
(74) *Attorney, Agent, or Firm* — Snell & Wilmer L.L.P.

(57) ABSTRACT

The present invention provides a system and method for evaluating effects of process parameters on hydrogasification processes. The system includes a hydrogasification reactor, a pressurized feed system, a hopper system, a hydrogen gas source, and a carrier gas source. Pressurized carbonaceous material, such as coal, is fed to the reactor using the carrier gas and reacted with hydrogen to produce natural gas.

17 Claims, 6 Drawing Sheets

HYDROGASIFICATION REACTOR AND METHOD OF OPERATING SAME

GOVERNMENT LICENSE RIGHTS

The U.S. Government has a paid-up license in this invention and the right in limited circumstances to require the patent owner to license others on reasonable terms as provided for by the terms of Contract No. DE-FC26-06NT42759 awarded by the Department of Energy.

FIELD OF INVENTION

The present invention generally relates to systems and methods for producing substitute natural gas (SNG) from carbonaceous material. More particularly, the invention relates to systems and methods for producing SNG using hydrogasification of carbonaceous material and to techniques and systems for characterizing the hydrogasification process.

BACKGROUND OF THE INVENTION

Because of their relatively high energy density and their current availability, fossil fuels, such as coal, are currently used to supply most of the world's energy requirements. Unfortunately, use of such fuels is thought to generate a substantial portion of the greenhouse gas emissions. Thus, as global demand for energy and awareness of possible environmental damage caused by the use of fossil-fuel energy sources increase, it becomes increasingly desirable to use such energy sources more efficiently, while mitigating any negative environmental effects.

One technique that has been developed for more efficiently using coal and mitigating deleterious environmental effects includes gasification of coal to produce substitute natural gas (SNG). Producing SNG from coal is desirable because the produced SNG can be used in existing natural gas infrastructure (e.g. pipelines, compressor stations, and distribution networks), in commercial applications where natural gas is a feedstock, in domestic applications where natural gas is used for heating and cooking, and in electric utility applications where natural gas is used as a fuel to produce electricity. Coal reserves are substantially greater and more accessible than natural gas supply, and SNG can provide an additional supply of natural gas as the supply of existing natural gas sources diminishes. Producing SNG from coal also has the added advantages of providing stability to the supply and thus price of natural gas, and SNG is a higher density, cleaner burning fuel, as compared to coal.

Although some techniques for gasifying coal and the production of methane or SNG from coal are generally known, the various reactions and associated kinetics are not necessarily well understood. Accordingly, apparatus and techniques to study coal gasification reactions, and in particular, hydrogasification reactions, are desired.

SUMMARY OF THE INVENTION

The present invention provides an improved reactor and method for evaluating process conditions and reaction kinetics of hydrogasification processes. While the ways in which the present invention addresses the various drawbacks of the prior art are discussed in greater detail below, in general, the invention provides a system including a hydrogasification reactor with variable operation parameters and measurement and/or test equipment to evaluate effects of varying operating conditions on resultant products.

In accordance with various embodiments of the invention, a system is configured to allow manipulation of various operating parameters, such as reactants, reactant flow rates, reaction temperature, reaction pressure, feed particle size, feed type, reactor residence time, gas:solid feed ratio, and the like.

In accordance with further aspects, a system is configured to measure reactor temperature, reactor pressure, methane yield, product (e.g., char) properties, and the like.

In accordance with various embodiments of the invention, a reactor is configured as a double-wall reactor, having an interior wall and an exterior wall. A reaction occurs within an interior space of the inner wall. In accordance with particular aspects of these embodiments, pressurized gas is provided in the space between the interior and exterior walls. The pressurization is desirable to provide stability to the reactor during a hydrogasification process, which generally occurs at relatively high temperature and high pressure. In accordance with various aspects of these embodiments, the space between the interior and exterior walls is pressurized to a pressure greater than the reaction pressure within an interior portion of the inner wall. Providing a pressure on an exterior surface of the interior wall that is greater than the pressure on an interior surface of the interior (e.g., the reaction pressure) may be desirable to contain any potential leaks of materials within an interior portion of the inner wall.

In accordance with additional embodiments, the reactor is configured as a single-drop reactor.

In accordance with yet further embodiments, the reactor includes a high-pressure fuel feed system. In accordance with some aspects of these embodiments, a magnetic feeder is used to inject a pressurized fuel (e.g., coal) stream into a reaction area. In accordance with other aspects, a carrier gas is used to facilitate injection of the feed.

BRIEF DESCRIPTION OF THE DRAWINGS

The exemplary embodiments of the present invention will be described in connection with the appended drawing figures in which like numerals denote like elements and.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The present invention provides a hydrogasification reactor and system and method of using the reactor and system. More particularly, the invention provides a reactor and system for evaluating process conditions, reactants, and products of hydrogasification processes, such as hydrogasification of carbonaceous material(s).

The reactor and system of the present invention can be used to develop and understand hydrogasification reaction kinetics and understand the effects of process conditions on products, both desired and undesired, of hydrogasification reactions. The information that is obtained using the system and reactor can, in turn, be used to design other, e.g., larger production reactors and systems.

The reactor, system, and method of the present invention can be used for various hydrogasification processes and is conveniently described below in connection with hydrogasification of coal. However, the invention is not limited to such fuel, and can be used to react other material(s) with hydrogen.

Exemplary process parameters that can be manipulated, measured, and/or analyzed to determine their effects on reactions kinetics, feed conversion and reactant products include: carrier gas, temperature, pressure, coal type and size, residence time, hydrogen-to-carbon ratio, reactants, and the like.

As discussed in more detail below, hydrogasification of materials such as coal is exothermic and generally occurs at relatively high pressures and temperatures. Accordingly, systems and reactors in accordance with various embodiments of the invention are specifically designed to withstand such operating conditions.

Figure 1:
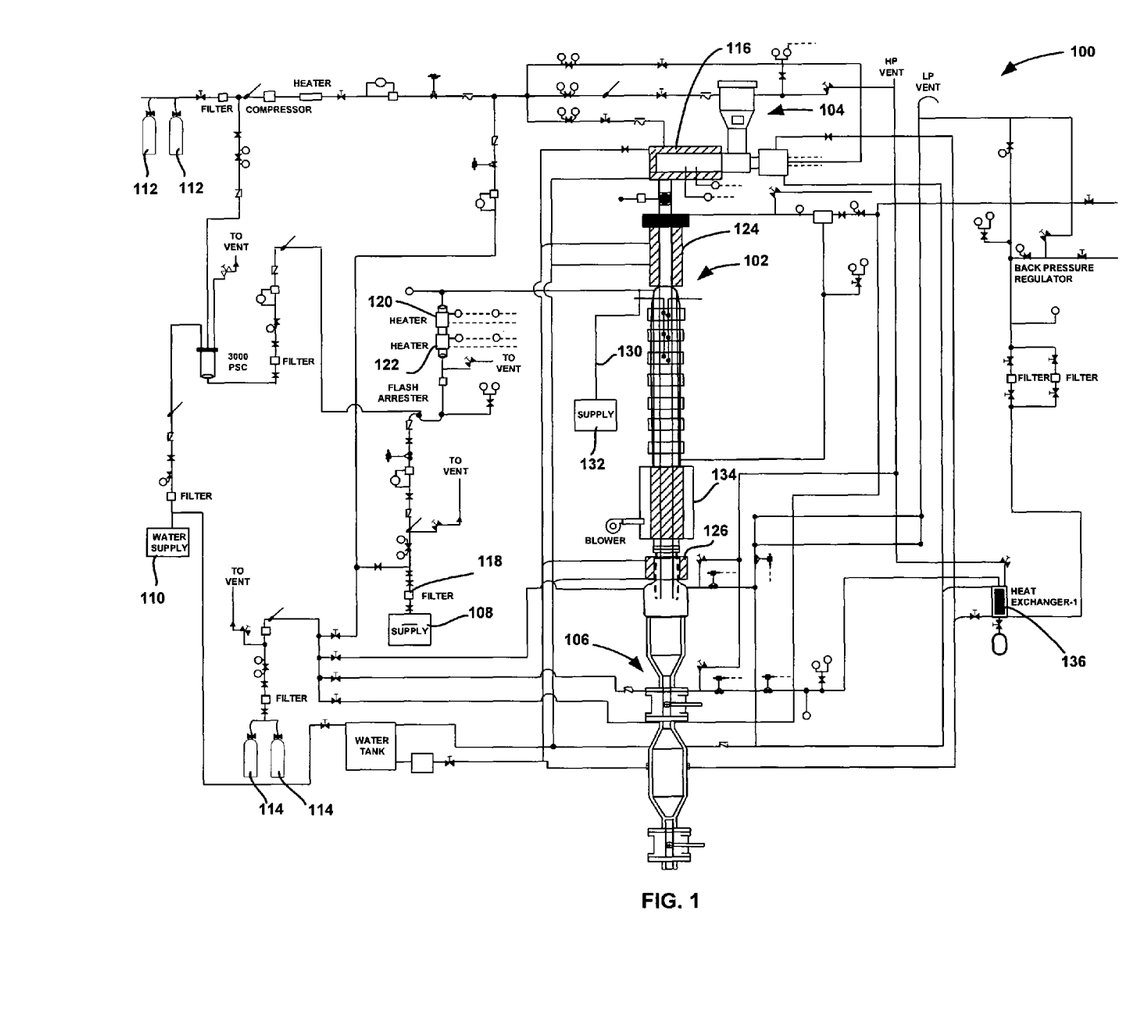
FIG. 1 schematically illustrates a system for producing substitute natural gas and evaluating the process in accordance with various embodiments of the invention.

FIG. 1 illustrates a system 100 in accordance with various embodiments of the invention. System 100 includes a hydrogasification reactor 102, a feed system 104, a hopper system 106, a hydrogen storage/supply unit 108, a water supply and storage unit 110, a carrier gas supply and storage unit 112, and a purge gas supply and storage unit 114. Although not illustrated, system 100 may also include suitable automatic shutdown systems.

In accordance with one exemplary embodiment, reactor 102 is designed as a single pass or single drop reactor, such that the injected coal makes a single pass through the reactor. However, the invention is not limited to such reactor design.

In operation, system 100 produces SNG by reacting carbonaceous material, such as crushed and pulverized coal, with hydrogen in hydrogasification reactor 102. The carbonaceous material is fed to reactor 102 using feed system 104. More particularly, carbonaceous material and a carrier gas (e.g., $CO_2$, $N_2$, $H_2$, or a combination thereof) from supply 112 are fed to feed system 104 to provide pressurized feed and the carrier gas to reactor 102. The feed is pressurized (e.g., to a pressure greater than about 500 psi or greater than about 1000 psi) to mitigate disruption to any reaction occurring in reactor 102. As illustrated, an additional carrier gas (e.g., $CO_2$, $N_2$, $H_2$, or a combination thereof) from supply 114 may optionally also be introduced into feed system 104 to, for example, evaluate the effects of alternative feed and/or reactant gases.

Operating parameters may be adjusted to determine desired operating conditions and/or effects of the parameters on reaction kinetics, thermodynamics, feed conversion, and the like. In accordance with various embodiments of the invention, a feed rate is adjustable from about 1 to about 25 or about 5 to about 15 lb/hour; a hydrogen feed rate is adjustable from about 300 to about 9000 standard cubic feet per hour; a coal to hydrogen ratio is adjustable from about 0.2 to about 0.4; a temperature is adjustable from about room temperature (e.g., about 77° F.) up to about 1900° F. or about 1200° F. to about 1800° F.; pressures within the reactor can be manipulated from ambient pressure to about 1200 psig or about 800 to about 1200 psig; residence time of hydrogen and feed material can be manipulated from about 5 seconds to about 50 seconds—e.g., about 5 seconds to about 40 seconds, or about 9 seconds to about 18 seconds; and the system can evaluate the effects of $H_2O$ (e.g., about 0.5-3 lb/hr) and $CO_2$ (e.g., about 5 to about 30 standard cubic feet/hour) additions to the feed. Effects of various types of feed such as coal of various sizes (e.g., about 75 to about 375 mesh; e.g., about 200 mesh (70% pass), or about 30 to about 100 microns) can also be tested in the reactor.

During the reaction, hydrogen is fed to reactor 102 from source 108. The hydrogen may be filtered using a filter 118 (e.g., an in-line stainless steel mesh filter) and heated using heaters 120, 122 (e.g., electric-type heaters) to a temperature of about 1200° F. to about 1600° F. or about 1500° F. Note that because hydrogen has a high thermal conductivity, heaters 120, 122 may be placed close to reactor 102 and system 100 may include ceramic insulation between heaters 120, 122 and reactor 102.

Figure 2:
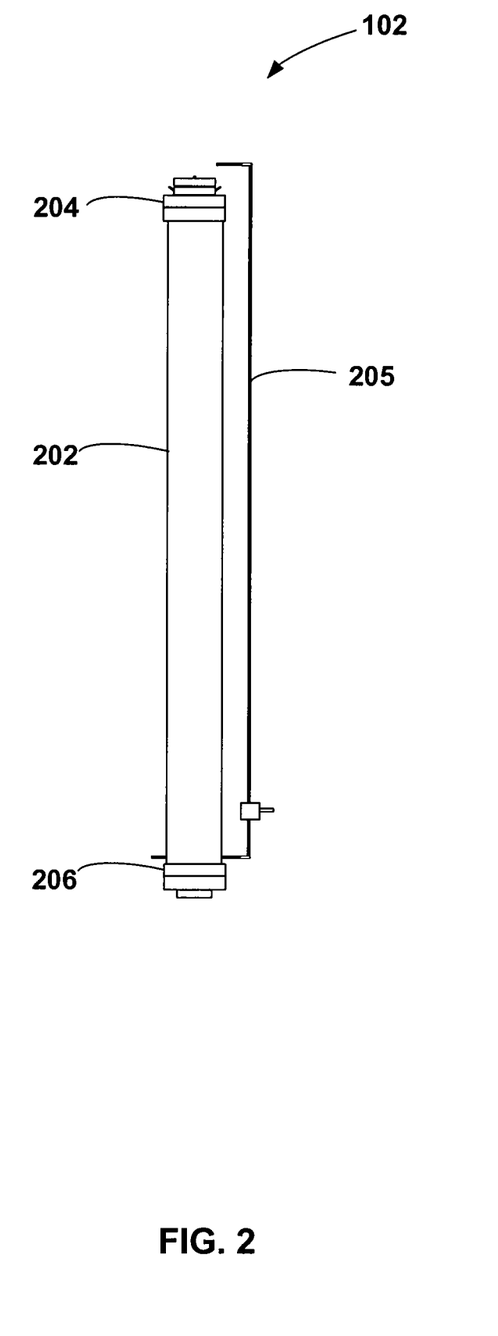
FIG. 2 illustrates a reactor in accordance with various embodiments of the present invention.
Figure 3:
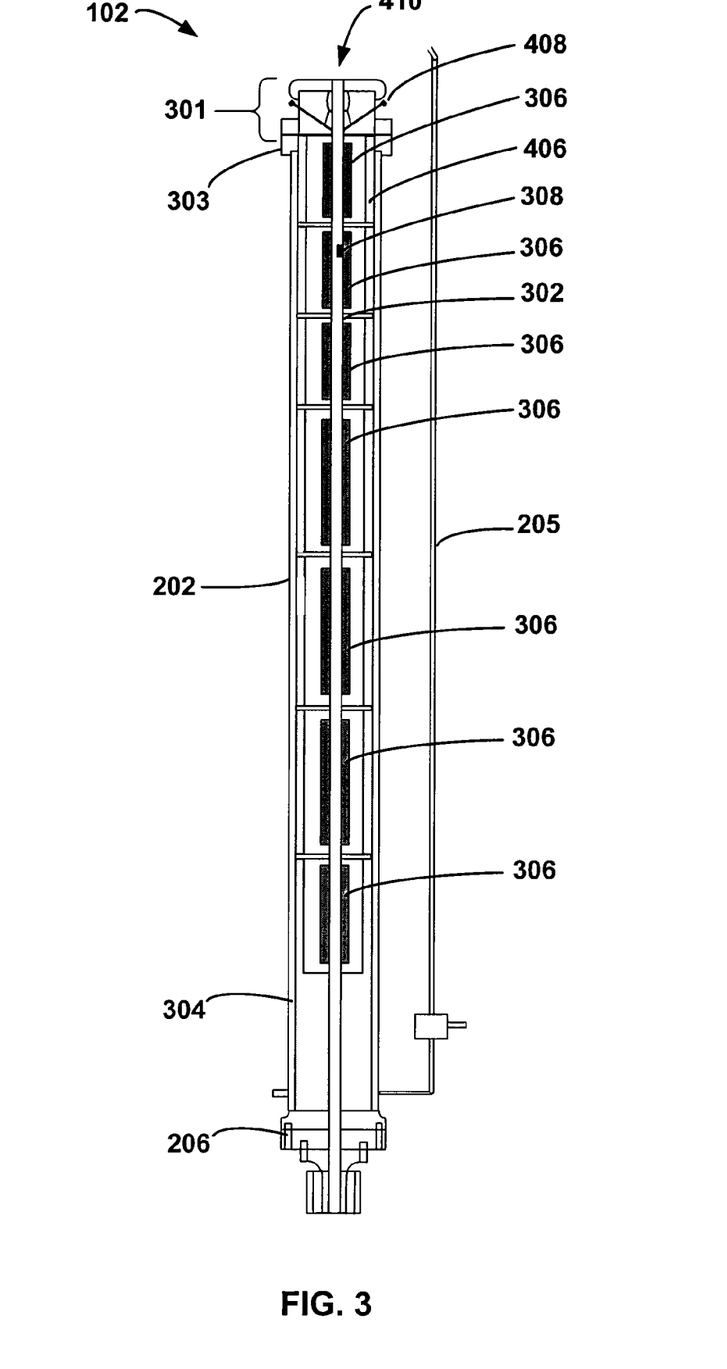
FIG. 3 illustrates a cut-away view of a reactor in accordance with various embodiments of the invention.
Figure 4:
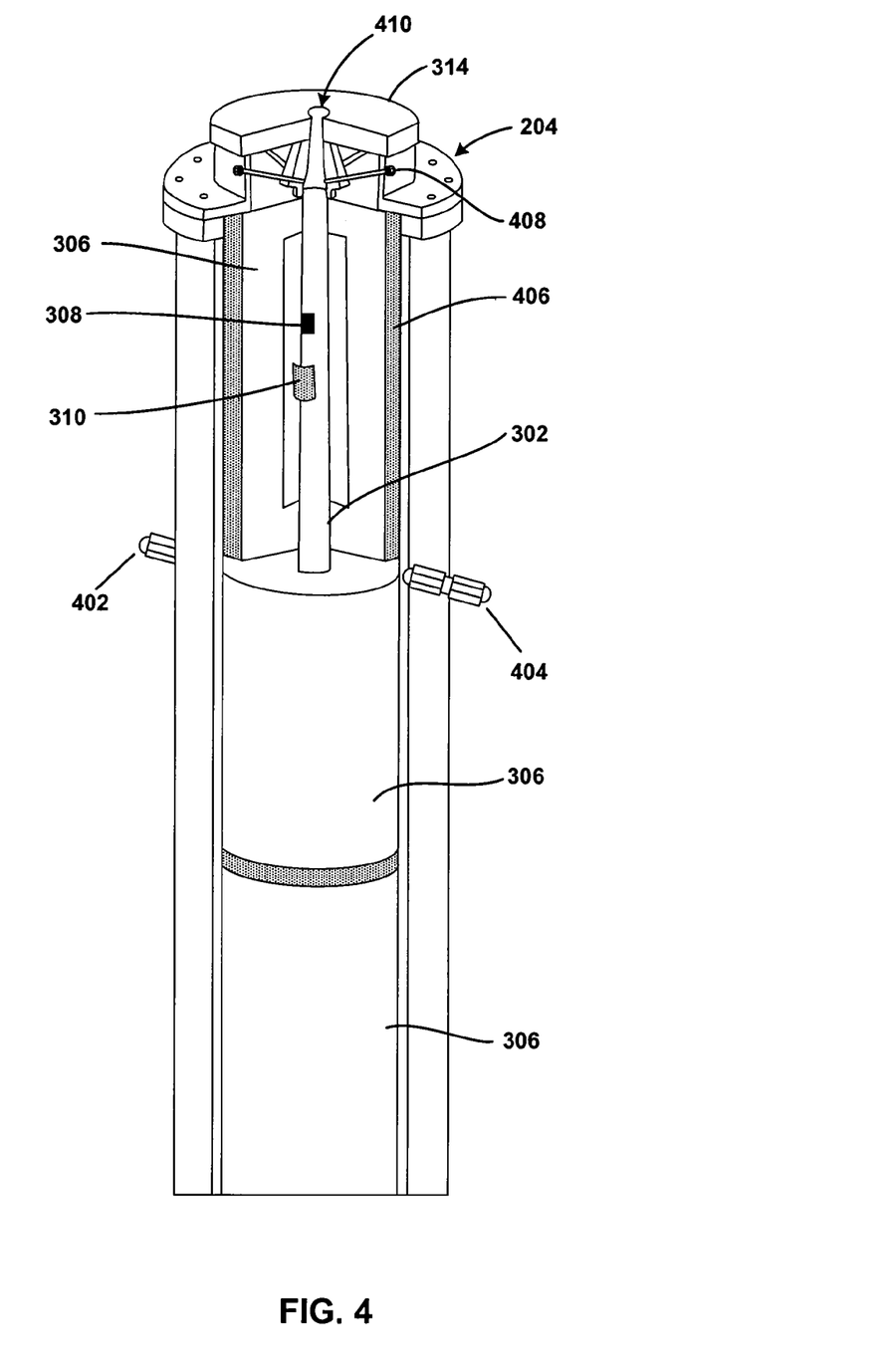
FIG. 4 illustrates a cross-sectional view of a top portion of a reactor in accordance with various embodiments of the invention.

Referring now to FIGS. 2-4, hydrogasification reactor 102 is illustrated in greater detail. In the illustrated embodiment, hydrogasification reactor 102 includes a double-walled hydrogasification chamber 202, including an inner wall 302 and an outer wall 304. The double-wall configuration allows for pressurized gas (e.g., air and/or nitrogen) in an annular space between an exterior surface of inner wall 302 and an interior surface of outer wall 304, which can be regulated using, for example, a balancing regulator 205. Reactor 102 also includes a top flange system 204 and a bottom flange system 206 to seal the annular space and maintain a desired pressure between inner wall 302 and outer wall 304. A length of reactor 102 may vary in accordance with various design parameters. In accordance with one example, reactor 102 is about 5 to about 20 or about 12 feet long.

Inner wall of vessel 302 may be configured in a variety of ways, depending on, for example, desired operating temperatures and pressures—both internal and external to wall 302. In general, wall 302 is configured to withstand internal pressure greater than about 1200 psig and temperatures up to about 1900° F. In accordance with one specific example, wall 302 is formed Inconel—e.g., Inconel 617 or 625 (1.8" id, 2" od).

Similarly, outer wall 304 may be formed in a variety of configurations using a variety of materials. In accordance with one example of the invention, outer wall is 304 is formed of schedule 80 (9.6" id, 10.8" od) 10" stainless steel and is configured to withstand pressures greater than about 1200 psig. Wall 304 may alternatively be formed of inconel, or like materials.

Referring now to FIGS. 3 and 4, a top portion 301 of reactor 102 includes a head assembly 303, a plurality of gas injection ports 408, and a feed inlet 410. Head assembly 303 is configured to form a seal between a top of internal wall 302 and a top of outer wall 304 and allow for reactant input through inlet 408 and pressurized feed through inlet 410 to an interior portion of wall 302.

In the illustrated embodiment, input injector ports 408 are angled relative to a centerline of the reactor. In accordance with various aspects of this embodiment, ports 408 are angled between about 30 and about 70 degrees, or about 40 to about 60 degrees or about 45 to about 50 degrees relative to the centerline through reactor 102 to reduce clogging of the reactor. A number of inlets 408 may vary in accordance with various design parameters, but are generally about evenly spaced from each other around a perimeter of the reactor. In the illustrated embodiment, reactor 102 includes 4 injector ports 408.

As illustrated in FIGS. 3 and 4, exemplary reactor 102 also includes heaters 306, internal thermocouples 308, and external thermocouples 310. Heaters 306 are placed on an exterior surface of inner wall 302. To facilitate rapid and control heating of reactor 102, heaters 306 are electric heaters configured to heat inner wall to a desired temperature (e.g., up to about 2300° F.). By way of one example, heaters 306 are ceramic heaters designed to heat to about 1300° F. to about 1900° F. A number of heaters may vary in accordance with design factors and considerations. By way of one example, seven heaters 306 are placed along an exterior surface of wall 302.

Thermocouples 308 are placed inside wall 302 to measure reactor 102 temperatures at various points along an interior portion of inner wall 302. In accordance with one specific example, thermocouples 308 are k-type thermocouples. Similarly, thermocouples 310 may be k-type thermocouples and placed along an exterior surface of wall 302 to measure the outside wall temperature. Thermocouples 308 may be inserted from reactor 102 head, and thermocouples 310 may be held in place with pads. A number of thermocouples 308, 310 may vary in accordance with various design parameters, such as length of reactor 102, type of thermocouples, and the like. In one example of the invention, reactor 102 includes 6 thermocouple 308 and 49 thermocouples 310. In accordance with further embodiments, at least some of thermocouples 308 and thermocouples 310 are coupled to a controller, not shown, to control heaters 306 to obtain or maintain a desired temperature. By way of one particular example, system 100 includes seven thermocouples 310 for each heater 306, such that two thermocouples are placed above, below and proximate a heater to measure wall 302 temperature just above and below the heater, two thermocouples 310 are coupled to the heater exterior insulation layer and a safety/shut-down system, two thermocouples 310 are coupled to a controller to control the heater and a safety/shut-down system, and one thermocouple is placed middle and proximate wall 302 to measure the temperature of wall 302 in the middle position of heater 306. The invention, however, is not limited to such configuration.

As illustrated in FIG. 1, reactor 102 may also include an optional feed line 130, and supply 132, which may be used to feed additional reactant(s) to vessel 202. For example, line 130 and supply 132 may be used to feed oxygen and/or $H_2O$ to reactor 102 to combust with hydrogen to obtain a desired reaction temperature for a hydrogasification process (e.g., about 1,200° F. to about 1,600° F.).

Reactor 102 may also include ports, such as sealable ports 402, 404, to, for example, allow wiring, such as heater power wiring and thermocouple wiring to pass through outer wall 304.

As noted above, in accordance with various embodiments, an annular region 406 between inner wall 302 and outer wall 304 is pressurized to reduce an amount of stress on inner wall 302. In accordance with one example, a pressure within annular space 406 is greater than a pressure within inner wall 302 (e.g., about 15 psi greater), so that if there is a leak in inner wall 302, pressurized annular region 406 will cause any materials within inner wall 302 to continue to flow through reactor 102 and system 100.

Figure 5:
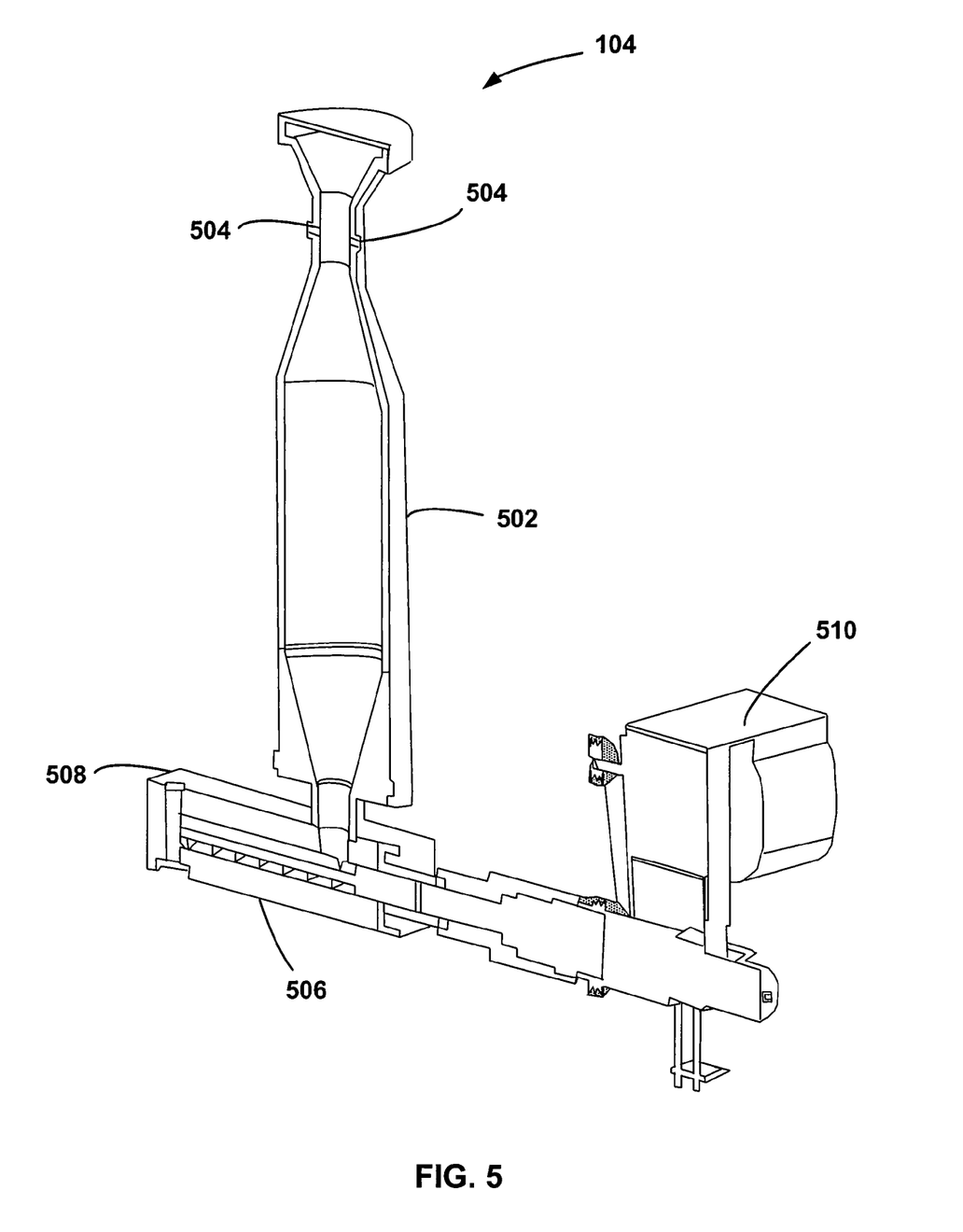
FIG. 5 illustrates an exemplary feed system for use with various embodiments of the invention.

Referring now to FIGS. 1 and 5, a feeder 104 (e.g., a magnetic feeder) includes a vessel 502, including feeder gas inputs 504, for receiving a carrier gas, coupled to a conveyor 506, which feeds pressurized coal and carrier gas to reactor 102. As illustrated, feeder 104 also includes a second gas input 508 to receive additional carrier gas to facilitate injection of the carrier gas/coal mixture into reactor 102 and a motor 510 to drive conveyor 506. As illustrated in FIG. 1, motor 510 may be cooled using water supply 110.

In general, feeder 104 is designed to feed coal to reactor 102 with minimal disruption to any ongoing reaction within reactor 102. In accordance with one example, coal and carrier gas are pressurized from about ambient to about 2000 psig, about 500 to about 1800 psig, or about 600 to about 1500 psig prior to being fed into reactor 102.

Referring again to FIG. 1, system 100 includes a cooler, e.g., water cooler 116 to regulate a temperature of the pressurized feed. Cooling system 116 may be coupled to water supply 110 and formed of, for example, ¼" stainless steel tubing.

Figure 6:
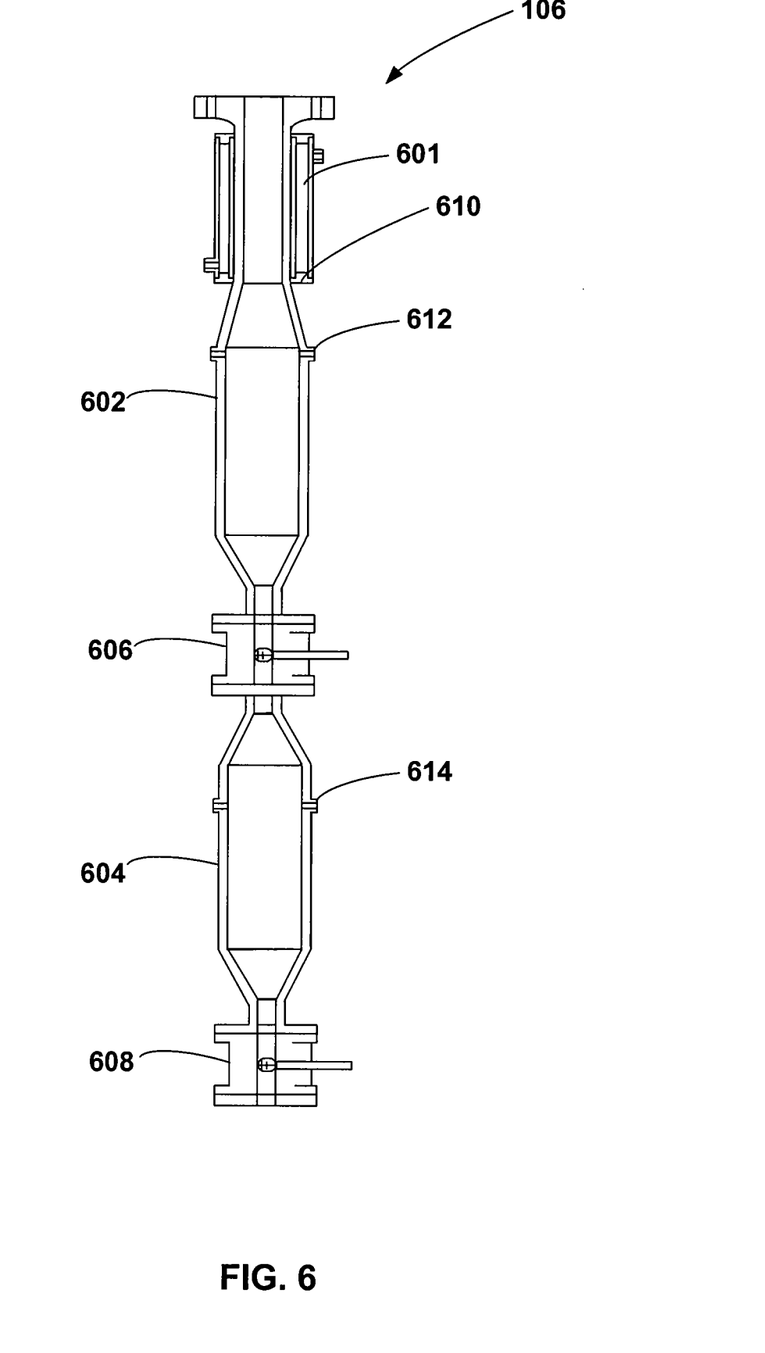
FIG. 6 illustrates char hoppers and valve systems for use with various embodiments of the invention.

Turning now to FIGS. 1 and 6, char hopper system 106 includes a first hopper 602, a second hopper 604, a valve 606 coupled between hopper 602 and hopper 604, and a valve 608 coupled to hopper 604. Hopper system 106 also includes a water cooler 601, a first outlet 612, and a second outlet 614. System 106 may also include temperature and/or pressure sensors located on an interior portion of hopper 602 and/or 604 to measure the temperature and/or pressure of hopper material.

In operation, as char and gasses flow to system 106 from reactor 102, during a transient stage, valve 606 is open. Transient solid residue can be collected by hopper 604 and transient materials, such as product gasses, including CO, $CH_4$, $CO_2$, $H_2$, $H_2O$, $H_2S$, COS, $C^{2+}$, olefins, paraffins, benzene, toluene, xylene, long-chain tars ad oils, HCl, phenolic species, and the like can be exhausted through outlet 612. Gaseous materials may be evaluated using, for example, gas chromatography and/or mass spectrometry. During a steady-state stage, obtained by closing valve 606, solid residue can be collected by hopper 602. Product gases, such as CO, $CH_4$, $CO_2$, $H_2$, $H_2O$, $H_2S$, COS, $C^{2+}$, olefins, paraffins, benzene, toluene, xylene, long-chain tars ad oils, HCl, phenolic species, and the like, can be exhausted through outlet 612 and analyzed by using the same techniques used to analyze transient materials. When a reaction is complete, solid residue from hopper 604 and 602 can easily be separately collected by opening valve 608.

Referring again to FIG. 1, system 100 may also include a cooler 134, such as a blower, to cool materials from reactor 102 before entering hopper system 106. System 100 may also include coolers 124, 126, to respectively cool materials entering reactor 102 and exiting reactor 102, and a heat exchanger 136 to further cool effluent from hopper system 106.

Although exemplary embodiments of the present invention are set forth herein, it should be appreciated that the invention is not so limited. For example, although the systems are described in connection with various process parameters, the invention is not so limited. Various modifications, variations, and enhancements of the system and method set forth herein may be made without departing from the spirit and scope of the present invention as set forth in the following claims and their equivalents.

What is claimed is:
1. A hydrogasification system, the system comprising:
a single-pass, vertically-oriented hydrogasification reactor, including an inner wall, an outer wall, a top portion, a bottom portion, and a pressurized sealed space between the inner and outer wall, wherein the inner wall is configured to withstand reaction pressure up to about 1200 psig. and wherein the top portion includes a plurality of injection ports angled between about 30 degrees and about 70 degrees relative to a centerline of the reactor and a feed inlet;
a hydrogen source coupled to the top portion of the hydrogasification reactor;

a heater located between the inner wall and outer wall, the heater configured to heat the inner wall to a temperature of about 1300° F. to about 1900° F.;

a feed system coupled to the top portion of the hydrogasification reactor; and a hopper system coupled to the bottom end of the hydrogasification reactor, the hopper system comprising a first hopper comprising a first outlet and a second outlet for analysis of transient materials, a second hopper coupled to the first outlet of the first hopper, and a valve between the first hopper and the second hopper, wherein the second outlet of the first hopper is not coupled to the second hopper, wherein when the valve is open, transient solid residue is collected in the second hopper, and when the valve is closed, steady-state solid residue is collected in the first hopper, and wherein reactants enter the reactor at the top portion and products exit the reactor at the bottom portion.

2. The hydrogasification system of claim 1, further comprising a carrier feed supply fluidly coupled to the feed system.

3. The hydrogasification system of claim 2, wherein the carrier feed supply comprises a material selected from the group consisting of nitrogen, hydrogen, carbon dioxide, and mixtures thereof.

4. The hydrogasification system of claim 3, wherein the carrier feed supply comprises carbon dioxide.

5. The hydrogasification system of claim 2, wherein the carrier feed supply comprises a motor and a conveyor.

6. The hydrogasification system of claim 2, wherein the carrier feed supply comprises a magnetically driven conveyor.

7. The hydrogasification system of claim 2, wherein the carrier feed supply is configured to provide feed pressurized to about 2000 psig. to the reactor.

8. The hydrogasification system of claim 1, further comprising a thermocouple located on an interior portion of the inner wall.

9. The hydrogasification system of claim 1, further comprising a thermocouple located on an exterior portion of the inner wall.

10. A hydrogasification system, the system comprising:

a single-pass, vertically-oriented hydrogasification reactor for reacting carbonaceous material with hydrogen, the hydrogasification reactor comprising a plurality of hydrogen injector ports angled between about 30 degrees and about 70 degrees relative to a centerline through the reactor, a top portion, a bottom portion, an inner wall, an outer wall, a sealed space between the inner wall and outer wall, and a heater within the sealed space, the heater configured to heat the inner wall to a temperature of about 1300° F. to about 1900° F.;

a hydrogen source coupled to the top portion of the hydrogasification reactor;

a hydrogen heater located between the hydrogasification reactor and the hydrogen source;

a pressurized feed system to provide a feed at greater than about 500 psig. coupled to the to portion of the hydrogasification reactor; and a hopper system coupled to the bottom portion of the hydrogasification reactor, the hopper system comprising a first hopper comprising a first outlet and a second outlet for analysis of transient materials, a second hopper coupled to the first outlet of the first hopper and the second outlet of the first hopper is not coupled to the second hopper, a first valve between the first hopper and the second hopper and a second valve coupled to the second hopper, and when the first valve is closed, steady-state solid residue is collected in the first hopper, and wherein reactants enter the reactor at the top portion and products exit the reactor at the second end.

11. The hydrogasification system of claim 10, wherein the hydrogasification reactor comprises a pressurized annular region between the inner wall and the outer wall.

12. The hydrogasification system of claim 11, further comprising a material selected from the group comprising nitrogen, air, and a combination thereof, in the pressurized annular region.

13. The hydrogasification system of claim 11, further comprising a plurality of heaters interposed between the inner wall and the outer wall.

14. The hydrogasification system of claim 10, further comprising a carrier gas source coupled to the pressurized feed system.

15. The hydrogasification system of claim 14, wherein the carrier gas source comprises a material selected from the group consisting of nitrogen, carbon dioxide, and hydrogen.

16. The hydrogasification system of claim 10, wherein the hydrogasification reactor is configured for an operating temperature of up to about 2300° F.

17. The hydrogasification system of claim 10, wherein the hydrogasification reactor is configured for an operating pressure of up to about 1200 psig.

* * * * *